Feb. 3, 1959  H. D. HUME  2,872,212
TRAILER HITCH FOR AUTOMOBILES
Filed Oct. 9, 1953  3 Sheets-Sheet 1

INVENTOR.
Horace D. Hume
BY
Atty.

Feb. 3, 1959 — H. D. HUME — 2,872,212
TRAILER HITCH FOR AUTOMOBILES
Filed Oct. 9, 1953 — 3 Sheets-Sheet 2
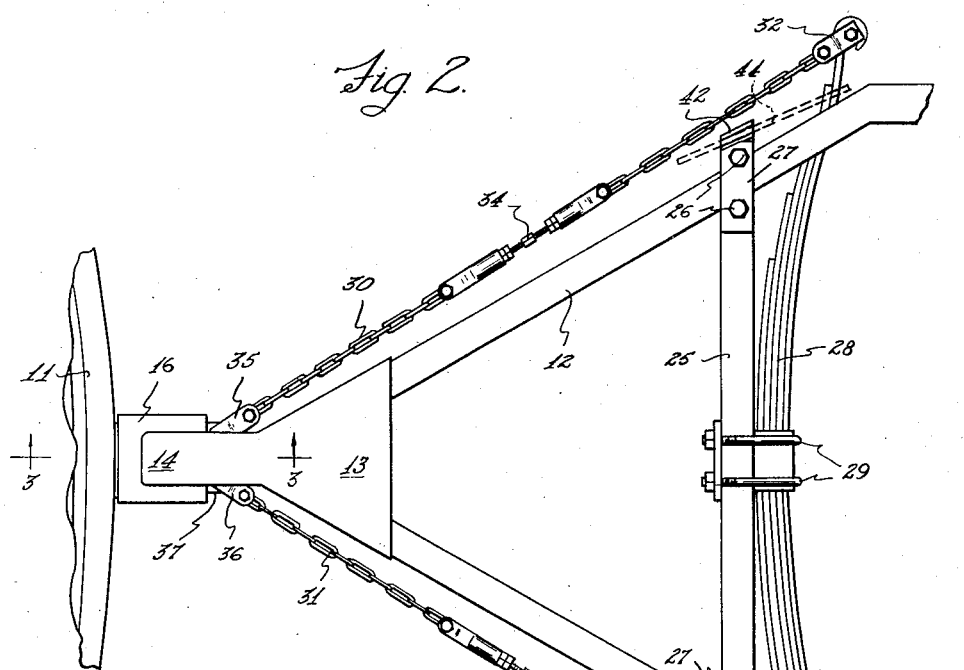
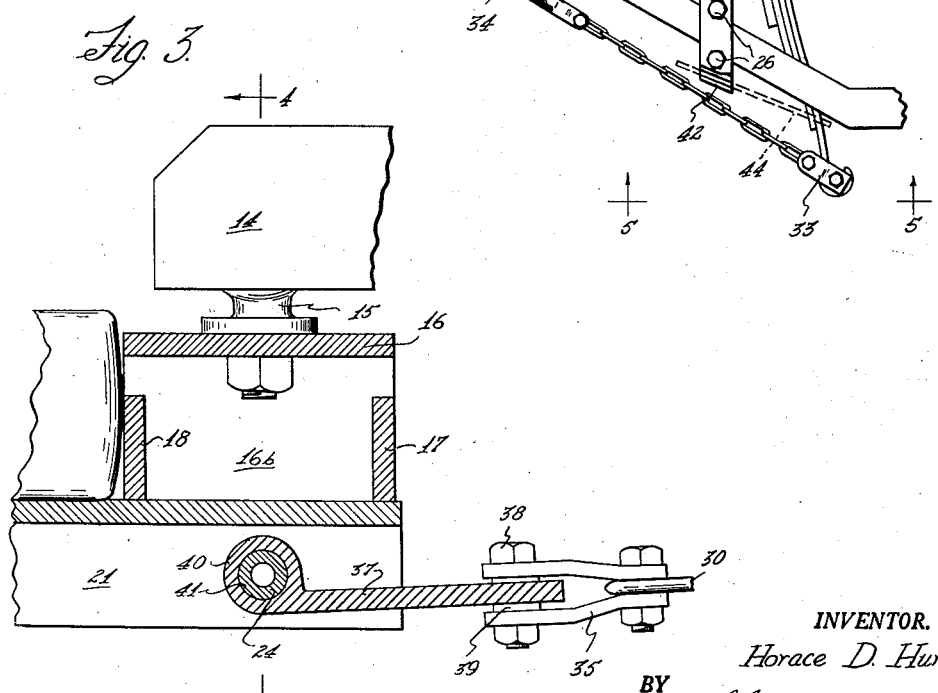
INVENTOR.
Horace D. Hume Feb. 3, 1959           H. D. HUME           2,872,212
TRAILER HITCH FOR AUTOMOBILES
Filed Oct. 9, 1953           3 Sheets-Sheet 3
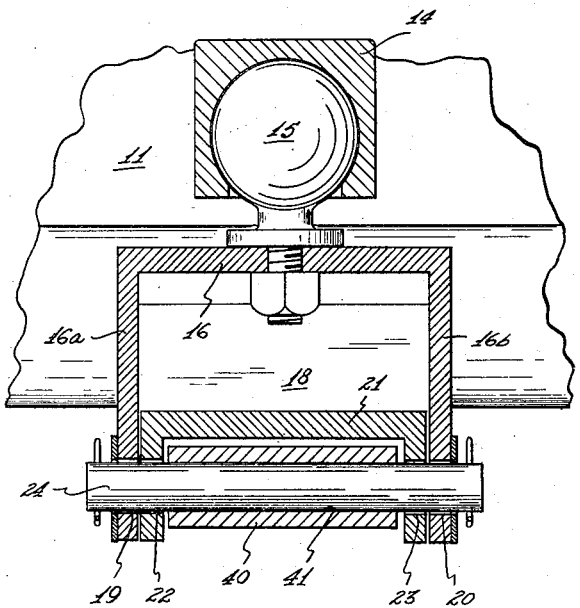
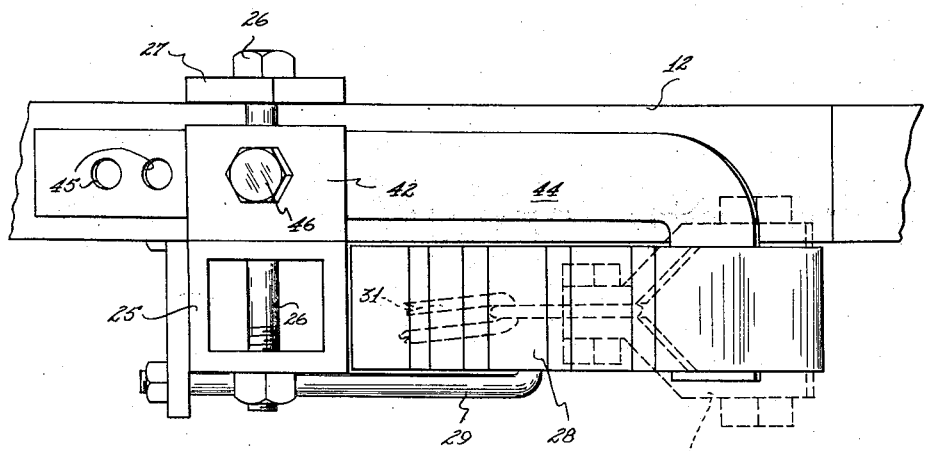
INVENTOR.
Horace D. Hume
BY
Atty.

United States Patent Office 2,872,212
Patented Feb. 3, 1959

2,872,212
TRAILER HITCH FOR AUTOMOBILES
Horace D. Hume, Mendota, Ill.
Application October 9, 1953, Serial No. 385,164
7 Claims. (Cl. 280—406)

My present invention relates to improvements in a trailer hitch.

In attaching trailers to powered vehicles, it is common practice to provide some sort of universal connection between the tow frame of the trailer and the rear of the towing vehicle. When the trailer is of the two wheeled type, a large portion of the weight of the trailer is transmitted through the universal connection to the rear of the towing vehicle. The rear of the towing vehicle is depressed and there is a tendency for the front, or steering wheels, to be raised from the ground. In addition to the increased wear on the rear portion of the towing vehicle, this sag in the universal connection causes dangerous floating of the front of the vehicle, and induces side sway. Each bump on the road gives rise to a downward pulse on the universal connection, which lifts the front of the towing vehicle and removes steering control from the operator.

It is the purpose of my present invention to provide a means for stiffening the universal connection between the towing vehicle and trailer to prevent sag and to provide also a means to restrict the side sway of the trailer.

My present invention also contemplates the utilization of the stiffening means with but one connection between the auto frame and the trailer. In my prior patents, No. 2,493,874 and No. 2,549,814, I have disclosed means to offset the tendency toward sag and side sway which utilized a plurality of connections between the towing vehicle and the trailer.

In my present invention, the only portion of the connecting mechanism which remains on the towing vehicle is a channel shaped auxiliary frame which is attached to the main frame of the vehicle and extends rearwardly for a short distance under the rear bumper of the vehicle. The rest of the hitch is attached to the trailer itself.

On the forward end of the tow frame of the trailer, I provide a ball and socket joint, the socket being attached to the trailer tow frame. The ball is attached to a box shaped member which is separated both from the trailer and the auxiliary frame on the towing vehicle. This box shaped member is adapted to be secured to the auxiliary frame on the towing vehicle by a pin which extends through the frame and the box member securing them together. The pin also secures a plate to the auxiliary frame, which plate has attached to its rear edge, two chains. The chains extend rearwardly to the opposite ends of a leaf spring which is attached to the tow frame of the trailer.

With this construction, when the ball and socket joint is depressed, the chains are pulled taut and the leaf spring must be flexed, thus retarding the sagging motion.

The nature and advantages of my invention will appear more fully from the following description and the accompanying drawings wherein a preferred form of the invention is shown. The description and drawings are illustrative only, however, and are not intended to limit the invention except insofar as it is limited by the claims.

In the drawings:

Figure 2 is an enlarged plan view of the invention;

Figure 3 is an enlarged fragmentary sectional view taken on the line 3—3 of Figure 2;

Figure 4 is a fragmentary sectional view taken on the line 4—4 of Figure 3; and

Figure 5 is an enlarged fragmentary side view looking in the direction of the arrows 5—5 of Figure 2.

Figure 1:
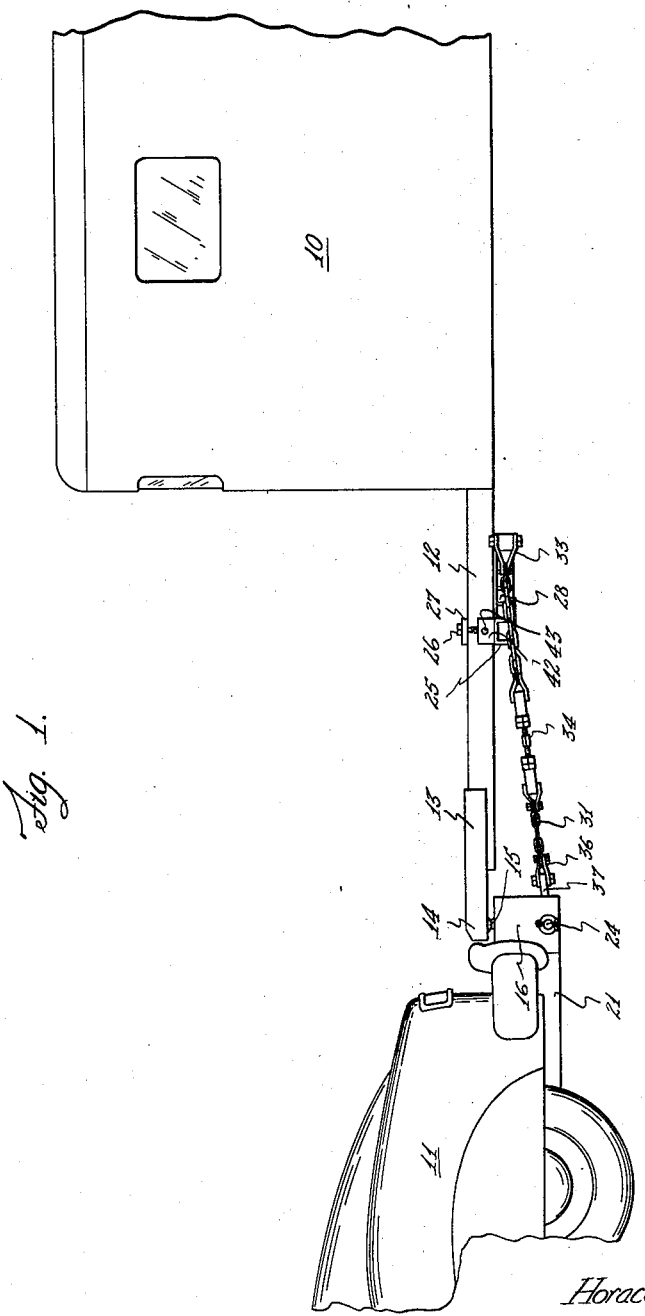
Figure 1 is a view in side elevation of a trailer and towing vehicle utilizing my invention.

Referring now to the drawings and to Figures 1 and 2 in particular, my improved trailer hitch is shown as attaching a trailer 10 to a towing vehicle 11. An A-shaped tow frame 12 extends forwardly from the body of the trailer 10. At the front of the tow frame 12, a forwardly extending member 13 is fixed. The member 13 has at its forward end a socket 14 which forms half of a ball and socket joint, which I use as the universal connection in this invention. A ball 15, the other half of the universal connection, is mounted on an inverted U-shaped bracket member 16, which is separate from the tow frame 12. The U-shaped member 16 has two transverse brace members 17 and 18 thereon and has apertures 19 and 20 formed in the depending legs 16a and 16b (see Figures 3 and 4) of the inverted U.

A channel shaped member 21 is secured to the frame of the towing vehicle 11, and extends rearwardly for a short distance under the rear bumper of the vehicle 11. Apertures 22 and 23 are formed near the rear end of the channel 21. The U-shaped member 16 is adapted to fit over the rear end of the channel 21, and is secured in position by a pin 24, which extends through the apertures 19 and 20 in the member 16 and the apertures 22 and 23 in the channel 21. In this manner, the universal connection is secured to the towing vehicle 11. The transverse braces 17 and 18 keep the U-shaped member 16 from pivoting about the pin 24 when the trailer 10 is being pulled behind the vehicle 11.

In order to prevent sag in the connection, I provide a stiffening means between the tow frame 12 and the channel 21. A cross beam 25 is secured to the tow frame 12 near the body of the trailer 10. The cross beam 25 is secured by several bolts 26 which extend through plates 27 and through the cross beam 25. The bolts 26 and the plates 27 clamp the cross beam 25 securely to the underside of the tow frame 12. The cross beam 25 has a leaf spring 28 fastened to it at its center by U-bolts 29. The leaf spring 28 extends outwardly on either side of the tow frame 12, and curves toward the body of the trailer 10. Flexible connectors 30 and 31, shown in the form of chains in the drawings, are attached to each end of the leaf spring 28 by clamps 32 and 33. Each of the chains 30 and 31 is broken near its center and has an adjusting mechanism 34 therein so that its length may be varied to tension it as desired. At the opposite end of the chains 30 and 31, clamps 35 and 36 are provided. These clamps 35 and 36 are attached to a plate 37 by bolts 38, and are provided with bushings 39 to reduce the wear on the plate 37. The plate 37 has at its forward end, a cylindrical portion 40, which has an aperture 41 therein. The plate 37 fits between the depending legs of the channel 21, and is rotatably secured in place by the pin 24, which extends through the aperture 41 in the cylindrical portion 40 of the plate 37.

With the construction just described, the trailer hitch is stiffened against sagging. The hitch is formed in a vertical plane, like a triangle, the tow bar 12 forming one side, the U-shaped member 16 and the channel 21 forming the second side, and the plate 37, the chains 30 and 31 and the leaf spring 28 forming the third side. The vertices of the triangle are first, the universal joint formed by the ball 15 and socket 14, second, the pin 24 connecting the channel 21 and the plate 37, and third, the U-bolt clamps 29 securing the leaf spring 28 to the cross member 25. In order to allow the triangle to change shape, or in other words, allow the universal connection to sag, one side of the triangle must be changed in length. The only side of the triangle that can change in length is the side formed by the plate 37, the chains 30 and 31 and the leaf spring 28. Elongating this side must flex the leaf spring 28 against its natural bend and is thus retarded by the leaf spring.

In order to allow the trailer hitch to be attached and released from the towing vehicle easily, I provide a means to take the tension of the leaf spring 28 off of the chains 30 and 31 so that the pin 24 may be easily removed or inserted. Figure 5 shows this construction.

On each end of the cross beam 25, a U-shaped bracket 42 is attached. The brackets 42 have apertures 43 therein. An L-shaped retaining arm 44 is fitted between the upstanding portions of each bracket 42. The retaining arms 44 have a series of apertures 45 along their length to receive bolts 46 which secure them to the bracket 42. The retaining arms 44 may be hooked over the ends of the leaf spring 28 to prevent them from assuming their natural position and tensioning the springs 30 and 31.

When the trailer 10 is to be attached to the tow car 11, the U-shaped member 16, attached to the tow frame 12 by the ball 15 and the socket 14, is placed on the rear of the channel 21, and the several apertures 19, 20, 22 and 23 are aligned. The plate 37 is then fitted between the legs of the channel 21 so that the aperture 41 in the cylindrical portion 40 is also aligned with the apertures 19, 20, 22 and 23. The pin 24 is then run through the several apertures 19, 20, 22, 23 and 41 and secured in place by cotter keys or other means. The plate 37 already has the clamps 35 and 36 and chains 30 and 31 secured thereon. All that remains to be done is to tighten the adjusting mechanisms 34 until the chains 30 and 31 are taut and the leaf spring 28 is flexed enough to keep the universal connection from sagging.

After this first attachment of the trailer 10 and towing vehicle 11, the chains 30 and 31 need not be adjusted as before. When it is desirable to release the two vehicles 10 and 11, the operator merely places his weight on the tow frame 12, thus causing the leaf spring 28 to be drawn back further than when only the trailer weight is involved. While the leaf spring is additionally flexed, the operator secures it in this position by hooking the retaining arms 44 over the ends of the leaf spring 28, and securing them to the brackets 42 by running the bolts 46 through the apertures 43 in the brackets 42 and through one of the apertures 45 in each retaining arm 44. When the operator removes his weight from the tow frame 12, the hitch ceases to sag and the chains 30 and 31 lose their tension. The pin 24 may then be easily drawn and reinserted when desired.

When traveling, the retaining arms 44 are, of course, released so that the leaf spring 28 can perform its function.

It is believed that the nature and advantages of my invention will appear fully from the foregoing description.

Having thus described my invention, I claim:

1. A coupling device for securing a trailer to a towing vehicle comprising a forwardly extending tow frame attached to the trailer, a universal joint connected to the front of the tow frame, a bracket connected to the universal joint, a tow member attached to the rear of the towing vehicle and extending rearwardly therefrom, the bracket being removably seated on said tow member, a removable pin extending through the bracket and tow member securing the bracket non-rotatably to the tow member, means on said removable pin to attach the ends of flexible connectors, said flexible connectors extending rearwardly therefrom, and a leaf spring extending transversely of the tow frame and having its center portion attached thereto, the flexible connectors being attached to the opposite ends of the leaf spring.

2. A coupling device for securing a trailer to a towing vehicle comprising a forwardly extending tow frame attached to the trailer, a universal joint connected to the front of the tow frame, a bracket connected to the universal joint, a tow member attached to the rear of the towing vehicle and extending rearwardly therefrom, the bracket being removably seated on said tow member, a removable pin extending through the bracket and tow member securing the bracket non-rotatably to the tow member, means on said removable pin to attach the ends of flexible connectors, said flexible connectors extending rearwardly therefrom, a leaf spring extending transversely of the tow frame and having its center portion attached thereto, the flexible connectors being attached to the opposite ends of the leaf spring, and means on the tow frame to hold the ends of the leaf spring in tension for unhitching the trailer.

3. A coupling device for securing a trailer to a towing vehicle comprising a forwardly extending tow frame on the trailer, a universal joint attached to the front of said tow frame, a bracket depending from said universal joint, a tow member attached to the towing vehicle and extending rearwardly therefrom, the bracket being seated on the tow member, a plate having a transverse aperture at one end, said bracket and said tow member each having aligned apertures therein, a removable pin extending through the bracket, the tow member and the plate securing them together, flexible connectors attached to the plate and extending rearwardly therefrom, a leaf spring extending transversely of the tow frame and having its center portion attached to the tow frame near the trailer body, said flexible connectors being attached to the opposite ends of said leaf spring, and means on the tow frame to hold the ends of the leaf spring in tension to allow the pin to be removed from the bracket, tow member and plate.

4. A coupling device for securing a trailer to a towing vehicle comprising a forwardly extending tow frame on the trailer, a universal joint attached to the front of said tow frame, a bracket depending from said universal joint, a tow member attached to the towing vehicle and extending rearwardly therefrom, the bracket being seated on the tow member, a plate having a transverse aperture at one end, said bracket and said tow member each having aligned apertures therein, a removable pin extending through the bracket, the tow member and the plate securing them together, flexible connectors attached to the plate and extending rearwardly therefrom, a leaf spring extending transversely of the tow frame and having its center portion attached to the tow frame near the trailer body, said flexible connectors being attached to the opposite ends of said leaf spring, means on the tow frame to hold the ends of the leaf spring in tension to allow the pin to be removed from the bracket, tow member and plate, said last named means comprising brackets attached to the tow frame near the ends of the leaf spring, L-shaped restraining arms extending rearwardly from the brackets and adapted to be hooked over the ends of the leaf springs, said arms having spaced apertures therein, said brackets having apertures therein, and bolts to connect said arms to said brackets.

5. A coupling device for securing a trailer to a towing vehicle comprising a forwardly extending tow frame attached to the trailer, a universal joint connected to the front of the tow frame, a bracket connected to the universal joint, said bracket having depending ears and having aligned apertures in said ears, a tow member attached to the towing vehicle and extending rearwardly therefrom and having a transverse aperture therein, the bracket being seated on the tow member and having its depending ears extending downward over the sides of the tow member, the apertures in the depending ears being aligned with the aperture in the tow member, a removable pin extending through the apertures in the bracket and the aperture in the tow member securing the bracket nonrotatably on the tow member, flexible connectors having means at their forward ends to connect them to the pin and having length adjusting mechanisms therein, a leaf spring extending transversely of the tow frame and attached at its center to the tow frame near the trailer body, said flexible connectors being attached to the opposite ends of the leaf spring, and means on the tow frame to hold the ends of the leaf spring in tension for unhitching the trailer.

6. A coupling device for securing a trailer to a towing vehicle comprising a forwardly extending tow frame attached to the trailer, a universal joint connected to the front of the tow frame, a bracket depending from the universal joint, said bracket having depending ears and having aligned apertures in said ears, a channel shaped tow member attached to the towing vehicle and extending rearwardly therefrom, aligned apertures in the flanges of the tow member, the bracket being seated on the tow member and having its depending ears extending downward over the flanges of the tow member, the apertures in the flanges of the tow member being aligned with the apertures in the bracket, a plate having a transverse aperture at one end being positioned between the flanges of the tow member, a removable pin extending through the apertures in the bracket, the tow member and the plate, said pin securing the bracket non-rotatably on the tow member and rotatably securing the plate to the tow member, flexible connectors being attached to the plate and extending rearwardly therefrom, length adjusting mechanisms in the flexible connectors, a leaf spring extending transversely of the tow frame and having its center portion attached to the tow frame near the trailer body, the flexible connectors being attached to the opposite ends of the leaf spring, and means on the tow frame to hold the ends of the leaf spring in tension to allow the pin to be removed, said means comprising brackets attached to the tow frame near the ends of the leaf spring, L-shaped restraining arms extending rearwardly from the brackets and adapted to be hooked over the ends of the leaf spring, said arms having spaced apertures therein, said brackets having apertures therein, and bolts to connect said arms to said brackets.

7. A device for securing a trailer to a towing vehicle comprising a forwardly extending tow frame attached to the trailer, coupling means connecting the tow frame to the towing vehicle which include a universal joint connected to the front of the tow frame, a bracket connected to the universal joint, a tow member secured to the vehicle, the bracket being removably seated on the tow member, and a removable pin extending through the bracket and the tow member and non-rotatably securing the bracket to the tow member, the coupling means being separable by removal of the pin, a leaf spring extending transversely of the tow frame and having its center portion secured thereto rearwardly of the coupling means, flexible connectors attached to the opposite ends of the leaf spring and extending forwardly therefrom, the forward ends of the connectors being attached to the coupling means at a distance below the universal joint.

References Cited in the file of this patent

UNITED STATES PATENTS

| 2,134,351 | Arehart | Oct. 25, 1938 |
| 2,309,766 | Harroun et al. | Feb. 2, 1943 |
| 2,453,941 | Smit | Nov. 16, 1948 |
| 2,493,874 | Hume | Jan. 10, 1950 |
| 2,507,189 | Arehart | May 9, 1950 |
| 2,597,657 | Mathisen | May 20, 1952 |
| 2,643,891 | Mosley | June 30, 1953 |

FOREIGN PATENTS

| 564,373 | Germany | Nov. 18, 1932 |